United States Patent
Amit et al.

(10) Patent No.: US 10,599,835 B2
(45) Date of Patent: Mar. 24, 2020

(54) 32-BIT ADDRESS SPACE CONTAINMENT TO SECURE PROCESSES FROM SPECULATIVE ROGUE CACHE LOADS

(71) Applicant: VMware, Inc., Palo Alto, CA (US)

(72) Inventors: Nadav Amit, Mountain View, CA (US); Dan Tsafrir, Sunnyvale, CA (US); Michael Wei, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 141 days.

(21) Appl. No.: 15/960,467

(22) Filed: Apr. 23, 2018

(65) Prior Publication Data

US 2019/0243776 A1 Aug. 8, 2019

Related U.S. Application Data

(60) Provisional application No. 62/627,064, filed on Feb. 6, 2018.

(51) Int. Cl.
| | | |
|---|---|---|
| *G06F 21/54* | (2013.01) | |
| *G06F 12/1009* | (2016.01) | |
| *G06F 12/14* | (2006.01) | |
| *G06F 21/52* | (2013.01) | |
| *G06F 21/74* | (2013.01) | |
| *G06F 21/57* | (2013.01) | |

(52) U.S. Cl.
CPC .......... *G06F 21/54* (2013.01); *G06F 12/1009* (2013.01); *G06F 12/1441* (2013.01); *G06F 21/52* (2013.01); *G06F 21/577* (2013.01); *G06F 21/74* (2013.01); *G06F 2212/1044* (2013.01); *G06F 2212/1052* (2013.01); *G06F 2212/657* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,002,084 B1 * | 6/2018 | Warkentin | .......... | G06F 12/1491 |
| 2011/0161620 A1 * | 6/2011 | Kaminski | .......... | G06F 12/1009 |
| | | | | 711/207 |
| 2019/0057040 A1 * | 2/2019 | Jiang | .......... | G06F 12/1009 |

* cited by examiner

*Primary Examiner* — Denise Tran (57) ABSTRACT

Embodiments are disclosed to mitigate the meltdown vulnerability by selectively using page table isolation. Page table isolation is enabled for 64-bit applications, so that unprivileged areas in the kernel address space cannot be accessed in user mode due to speculative execution by the processor. On the other hand, page table isolation is disabled for 32-bit applications thereby providing mapping into unprivileged areas in the kernel address space. However, speculative execution is limited to a 32-bit address space in a 32-bit application, and s access to unprivileged areas in the kernel address space can be inhibited.

20 Claims, 8 Drawing Sheets

32-BIT ADDRESS SPACE CONTAINMENT TO SECURE PROCESSES FROM SPECULATIVE ROGUE CACHE LOADS

CROSS REFERENCE TO RELATED APPLICATION

Pursuant to 35 U.S.C. § 119(e), this application is entitled to and claims the benefit of the filing date of U.S. Provisional App. No. 62/627,064 filed Feb. 6, 2018, the content of which is incorporated herein by reference in its entirety for all purposes.

This application is related to the following commonly owned and concurrently filed applications, the content of each of which is incorporated herein by reference in its entirety for all purposes:
- U.S. application Ser. No. 16/016,254 filed Jun. 22, 2018, entitled "Separate Cores to Secure Processes From Speculative Rogue Cache Loads"
- U.S. application Ser. No. 16/004,180 filed Jun. 8, 2018, entitled "Compilation-Time Checks to Secure Processes From Speculative Rogue Cache Loads"
- U.S. application Ser. No. 16/044,191 filed Jun. 8, 2018, entitled "Dynamic Binary Translation to Secure Processes From Speculative Rogue Cache Loads"

BACKGROUND

The "meltdown" hardware security vulnerability enables unprivileged processes to read inaccessible kernel memory by exploiting speculative execution. Generally, a malicious user can trick the CPU into speculatively accessing u[j], such that u is a user array and j is some private data of the kernel that is unknown to the user. Because u[j] is now cached in user-space, the user can deduce the value of j by timing access to u's elements. The vulnerability affects microprocessors from Intel, IBM, and ARM released over the last two decades. Fixing the vulnerability will have a cost in terms of real dollars that may eclipse the Y2K bug. Unlike Y2K, fixing meltdown will have a lasting performance impact, as patching it requires establishing barriers to speculation and isolating the kernel.

Meltdown is made possible because operating systems traditionally map the kernel's address space into the process page tables of every process for efficiency; in other words, the virtual address space of each process includes the user address space for that process and the kernel address space. System designers rely on hardware protection to prevent unauthorized user access by marking the kernel memory pages as privileged. Unfortunately, on meltdown-vulnerable CPUs, a user process can speculatively access these privileged kernel pages, thereby leaking kernel data indirectly. With instruction pipelining, for example, data from an unauthorized address can be temporarily loaded into the CPU's cache during out-of-order execution. This cache presents a side-channel attack opportunity that allows an unprivileged process to bypass the normal privilege checks that isolate that process from accessing data belonging to the operating system. As a consequence, the unprivileged process can read data from any address that is mapped to the current process' virtual address space, including the kernel's address space.

The canonical defense against meltdown recommended by CPU vendors is to separate the kernel and user into two different address spaces. This technique, known as "page table isolation" (PTI), is employed in various operating systems including BSD, Linux, OS X, and Windows. Whereas current systems have a single set of process page tables for each process, PTI uses implements two sets of process page tables. One set is essentially unchanged; it includes both kernel-space and user-space addresses, but it is only used when the system is running in kernel mode. The second set contains a copy of all of the user-space mappings, but leaves out much the kernel side. Instead, there is a minimal set of kernel-space mappings that provides the information needed to handle system calls and interrupts, but no more. Whenever a process is running in user mode, the second set of process page tables will be active. The bulk of the kernel's address space will thus be completely hidden from the process, defeating the known hardware-based attacks. Whenever the system needs to switch to kernel mode, in response to a system call, an exception, or an interrupt, for example, a switch to the first set of process page tables will be used.

PTI has been shown to reduce the performance of some workloads by as much as 30% or more. Especially affected are workloads that frequently make system calls into the kernel and must therefore suffer PTI overhead associated with context switching. Presumably, meltdown could be fixed in future processors, potentially without a performance penalty. But it would be impractical if not impossible to fix the billions of processors already in service due to the hardware nature of the vulnerability. The situation is especially dire for embedded, real-time applications which use meltdown-vulnerable processors, such as avionics, railway controls, medical, industrial control, and other time-sensitive systems. These safety-critical systems may have been deployed with the expectation that the processor would operate in a fixed performance envelope, an assumption which may no longer hold if PTI is enabled for those systems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In accordance with the present disclosure, PTI can be disabled for 32-bit applications. Processing in accordance with embodiments of the present disclosure, referred to as "shrink," operates on workloads fitting into 32-bit address spaces. In some embodiments, the 32-bit compatibility hardware feature in some 64-bit CPUs can provide protection: in a 64-bit system, the kernel space resides outside of any 32-bit space. In accordance with the present disclosure, workloads that fit into 32-bit address spaces, can prevent the CPU from speculatively reading kernel pages. For example, a given application can be compiled to produce 64-bit code or 32-bit code. If PTI for a given application is not desired, then the source code for that application can be compiled to produce a 32-bit version of the executable code; otherwise, the 64-bit version can be used. Thus, though PTI can reduce the risk of the meltdown vulnerability for 64-bit applications, it does so at the cost reduced performance in the CPU. However, if the 32-bit executable version of an application is suitable, then executing the 32-bit version can avoid the meltdown vulnerability while at the same time retaining CPU performance.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
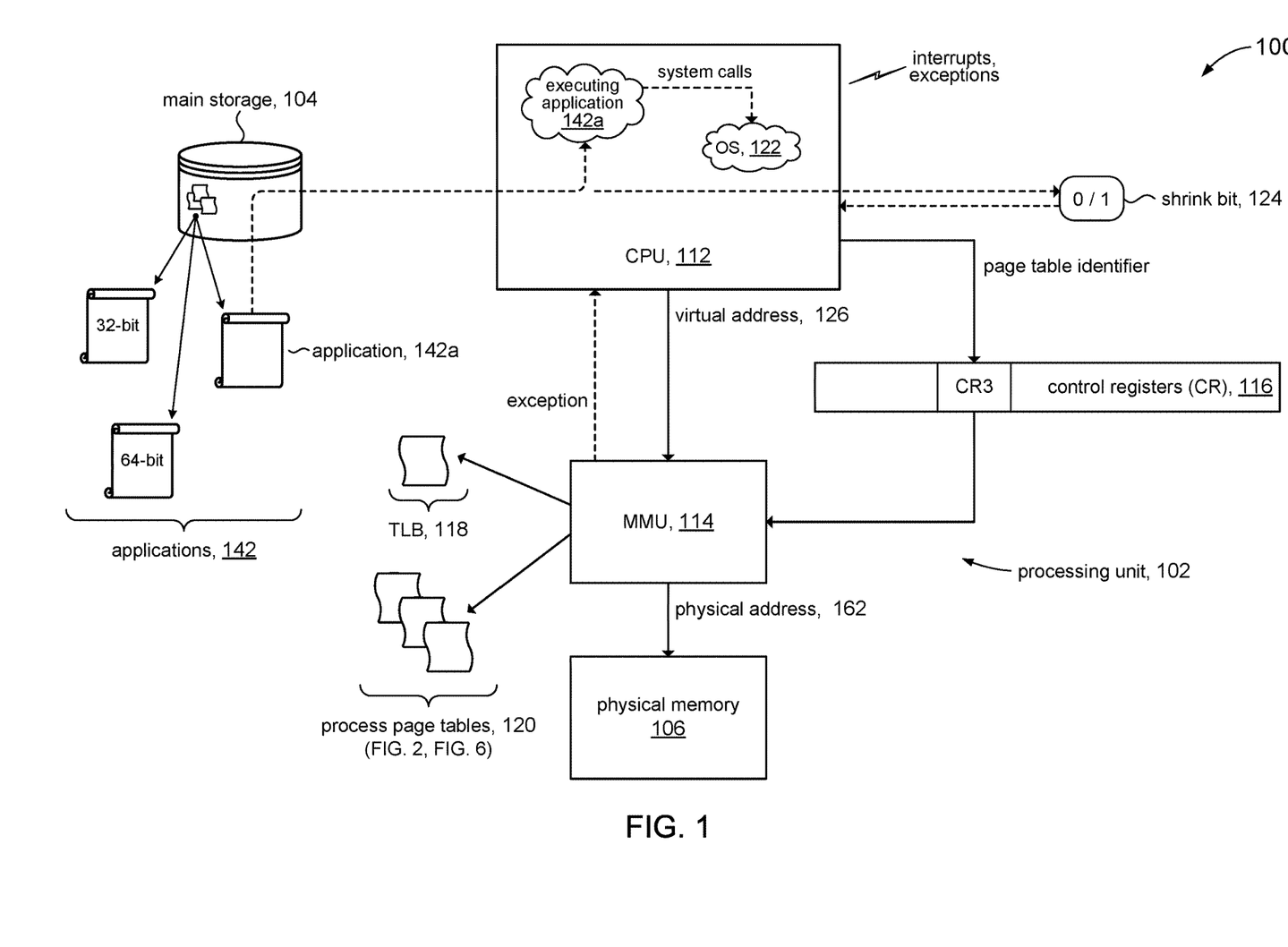
FIG. 1 shows a computer system in accordance with the present disclosure.

FIG. 1 shows an illustrative configuration of a computer system 100 in accordance with some embodiments of the present disclosure. The computer system 100 can include a processing unit 102, main storage 104, and a physical memory 106, among other system elements that are not shown.

The processing unit 102 can include central processing unit (CPU) 112 or other suitable processing core to receive and execute computer instructions. The CPU 112 can execute an operating system (OS) 122 comprising a set of such computer instructions to support the execution of applications 142, to handle interrupts and exceptions. The OS 122 can include a shrink bit 124 (size flag) that is associated with each application 142 to support its execution in accordance with the present disclosure. In some embodiments, for example, the OS 122 can include a process table (not shown) that has a process table entry for each executing application. The process table entry can include a shrink bit 124 that corresponds to the executing application.

The processing unit 102 can include a memory management unit (MMU) 114 to provide and support the virtual memory using the physical memory 106. The MMU 114 can translate a virtual address 126 from CPU 112 into a physical address 162 that identifies a memory location in physical memory 106. The MMU 114 can maintain a translation lookaside buffer (TLB) 118 to facilitate the translation process. In some embodiments, for example, the TLB 118 can be an associative cache that stores recent translations of virtual addresses to physical addresses to reduce translation time for faster access to physical memory 106.

The processing unit 102 can execute instructions in "kernel mode" (also referred to variously as supervisor mode, privileged mode, etc.) or in "user mode." In some embodiments, the CPU 112 can include a set of control registers 116 to support operations in the CPU 112. One of the control registers 116 can include a mode bit (not shown) in that indicates whether the processing unit 102 is executing in kernel mode or in user mode. In kernel mode, the executing code has complete and unrestricted access to the underlying hardware, and can perform any operation allowed by its architecture. It can execute any CPU instruction and reference any memory address. By comparison, the capabilities of code executing in user mode are typically a subset of those available in kernel mode; e.g., the code typically cannot directly access hardware and must use system calls to access hardware.

The MMU 114 can perform virtual to physical address translation using a process page tables 120 to translate a virtual address 126 into a physical address 162. The control registers 116 can include a register CR3 that specifies a set of process page tables to support virtual memory. The OS 122 can create a virtual address space for each executing application. The OS 122 can set up and manage several sets of process page tables 120 corresponding to different virtual address spaces, and use the CR3 register to tell the MMU 114 which process page tables 120 to use. The OS 122 can be configured to manage the sets of pages 120 in accordance with the present disclosure to improve performance while at the same time addressing the meltdown scenarios described above. This aspect of the present disclosure is discussed in more detail below.

The main storage 104 can be any type or form of storage device or medium capable of storing data and/or other computer-readable instructions. For example, main storage 104 can be a magnetic disk drive (e.g., a so-called hard drive), a solid state drive, a floppy disk drive, a magnetic tape drive, an optical disk drive, a flash drive, or the like. In some embodiments, main storage 104 can comprise a removable storage unit to store computer software, data, or other computer-readable information. Examples of suitable removable storage units include, for example, a floppy disk, a magnetic tape, an optical disk, a flash memory device, or the like.

The main storage 104 can store executable applications 142 (binary files) comprising computer instructions for execution by CPU 112. An application 142a, for example, can be loaded into physical memory 106 and executed by CPU 112. The executing application 142a (also referred to as a "process") can make system calls into the OS 122 to perform tasks such as reading or writing data, communicating with other devices, and so on.

The physical memory 106 can be any type or form of storage device or medium capable of storing data and/or other computer-readable instructions. Examples of physical memory 106 include, for example, random access memory (RAM), flash memory, or any other suitable memory device.

In accordance with some embodiments of the present disclosure, the CPU 112 has a 64-bit architecture. This generally refers to processors that are designed with datapaths, integer size, and memory addresses that are 64-bits wide, and in some designs may include widths that are an integer multiples of 64. A 64-bit architecture can also refer to the processor registers (e.g., general purpose registers), address buses, and data buses being 64 bits wide. The Intel® Xeon® processor, for example, has a 64-bit architecture.

In accordance with the present disclosure, the computer instructions comprising some applications 142 can be machine code of one kind whose instruction set is defined for a 64-bit architecture (e.g., the x86-64 instruction set).

Other applications 142 can comprise computer instructions comprising machine code of another kind whose instruction set is defined for a 32-bit architecture (e.g. the x86 instruction set). In other words, some applications 142 can be compiled from their source code to produce machine code defined for a 64-bit processor. Such applications can be variously referred to using terms that include the "64-bit" descriptor, such as 64-bit application, 64-bit machine code, 64-bit instruction set, and so on. Similarly, other applications 142 can be compiled to produce machine code defined for a 32-bit processor, an such applications can be variously referred to using terms that include the "32-bit" descriptor, such as 32-bit application, 32-bit machine code, 32-bit instruction set, and so on.

In accordance with the present disclosure, the shrink bit 124 that is associated with an executing application 142a can be set when the application is a 32-bit application (the application can be referred to as "shrunk"). Conversely, the shrink bit 124 is not set when the application is a 64-bit application (the application can be referred to as "not shrunk"). This aspect of the present disclosure is discussed in more detail below.

In accordance with the present disclosure, the CPU 112 can be configured to execute applications 142 comprising 64-bit machine code and applications comprising 32-bit machine code. When the CPU 112 executes applications comprising 32-bit machine code, the CPU can be said to be executing in "32-bit compatibility mode."

Figure 2:
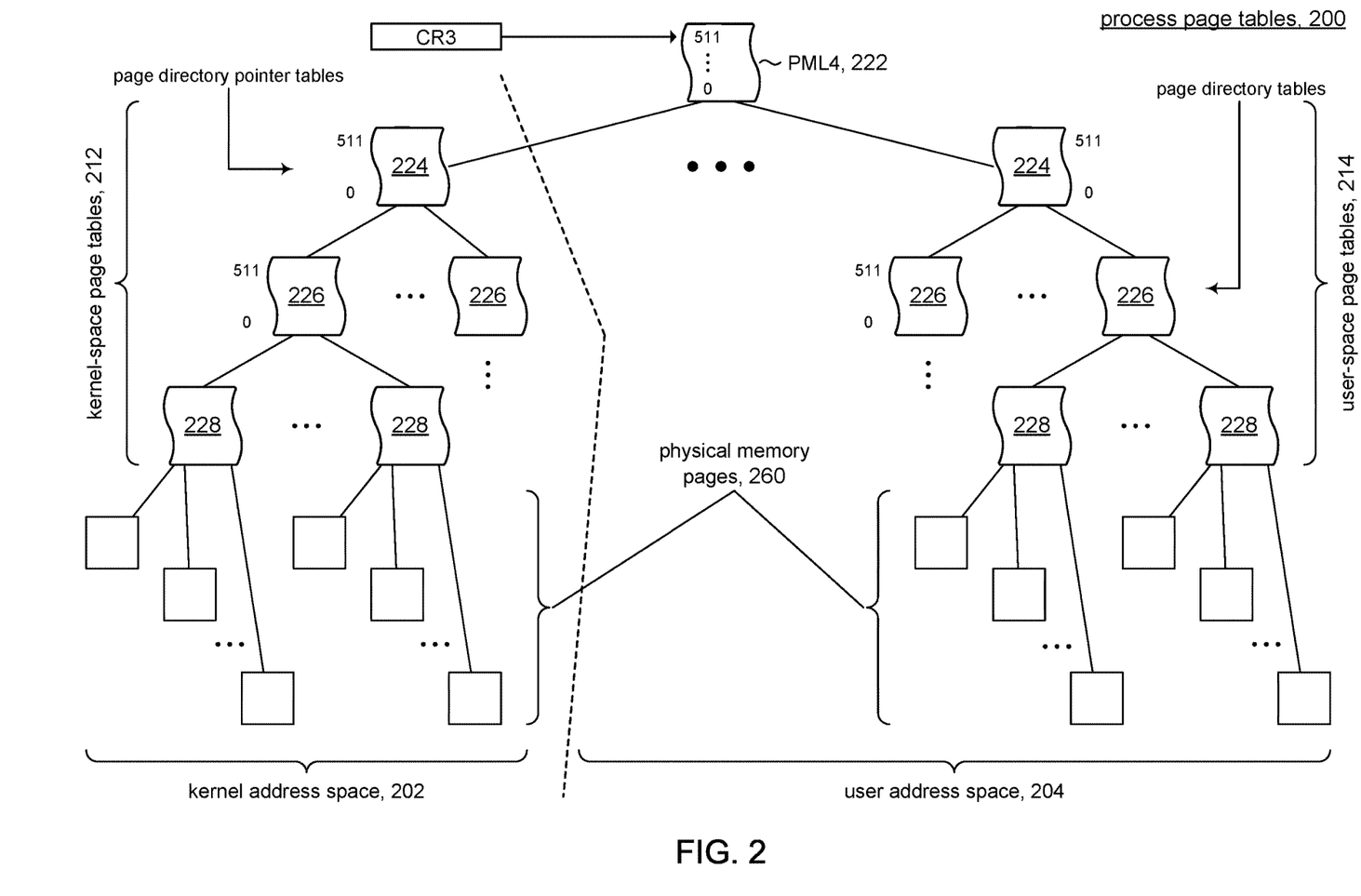
FIG. 2 illustrates an example of process page tables used to define a virtual address space without page table isolation.

FIG. 2 shows an illustrative example of a set of process page tables 200 that can be used to provide virtual memory in the computer system 100 for an executing application 142a. As used herein, an executing application may also be referred to as a "process." The page tables 200 define the virtual address space for that process. The MMU 114 can use page tables 200 to perform virtual address to physical address translation. In some embodiments, the MMU 114 can divide the virtual address space (the range of addresses used by the processor) into pages, each having a size which is a power of 2, usually a few kilobytes, but they may be much larger.

The process page tables 200 can divide the virtual address space into a kernel address space 202 and a user address space 204. The kernel address space 202 is reserved for the OS 122 and privileged processes. The user address space 204 is unique to each process; e.g., a given process will have a user address space that cannot be accessed by another process. The memory mapping tables that are associated with the kernel address space 202 can be referred to generally as the kernel-space page tables 212. Likewise, the memory mapping tables that are associated with the user address space 204 can be referred to generally as the user-space page tables 214.

The process page tables 200 can be organized in a hierarchy of memory mapping tables, which in some embodiments can be stored in physical memory 106. In some embodiments, the hierarchy comprises four levels of memory mapping tables. Each memory mapping table in the hierarchy comprises 512 table entries (e.g., indexed from 0-511), so 9 bits would be used to index each memory mapping table. It will be appreciated that in other embodiments the memory mapping tables can be defined with different size parameters.

The top-most (root) memory mapping table 222 in the hierarchy can be referred to as PML4 (page map level 4). Table entries in PML4 222 can include pointers (physical memory addresses) to the next level memory mapping tables 224, which in some embodiments are referred to as "page directory pointer" tables. Table entries in the page directory pointer tables 224 can include pointers to the third level memory mapping tables 226, which in some embodiments are referred to as "page directory" tables. Table entries in the page directory tables 226 can include pointers to the fourth level memory mapping tables 228, which in some embodiments are referred to as "page" tables. Table entries in the page tables 228 can include pointers to pages (physical memory pages) 260 of physical memory 106. A description of virtual to physical address translation using the process page tables 200 is discussed below.

The user address space 204 addresses those portions of physical memory 106 that a process has read and write access to. Access to portions of physical memory 106 that map to the kernel address space 202 are generally restricted to the OS 122 and privileged processes. Accordingly, access attempts to the kernel address space 202 by an unprivileged process executing in user mode can raise exception events in the CPU. In some embodiments, for example, the memory mapping tables can include a bit (not shown) or other information that indicates a given physical memory page 260 is mapped to the kernel address space 202. When the processor 102 is executing in user mode, an access to that physical memory page 260 can raise an exception (e.g., from MMU 114, FIG. 1), which can be handled by the OS 122 (e.g., the OS can "kill" the offending process).

Figure 3:
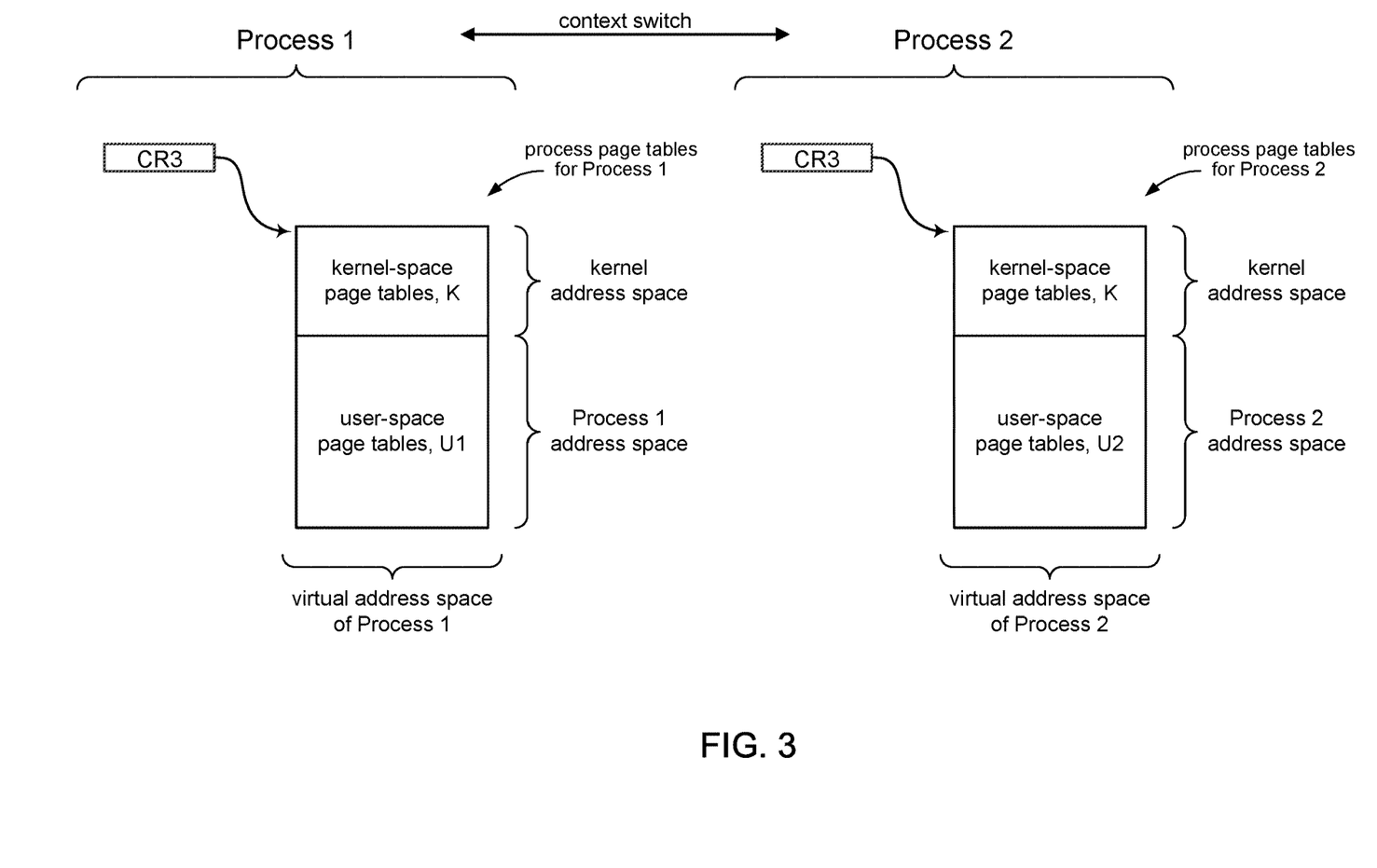
FIG. 3 illustrates kernel and user address spaces during context switching without page table isolation.

The OS 122 can define a virtual address space for each process by defining a set of process page tables 200 for each process. In some embodiments, the kernel address space is common to every process. Accordingly, the OS 122 can create or otherwise define a set of process page tables 200 for a process by creating a set of user-space page tables 214 unique to that process, and combining that with the common set of kernel-space page tables 212. When the OS 122 switches execution from one process to another process (referred to as a context switch), the OS 122 can load the CR3 register (FIG. 1) with the physical address (pointer) of the PML4 of the process page tables 200 of the switched-in process. This is schematically illustrated in FIG. 3, where the virtual address spaces of Process 1 and Process 2 are defined using the same kernel-space page tables (K), but with separate user-space page tables (U1 and U2, respectively). The CR3 register points to the process page tables corresponding to each process.

Figure 4:
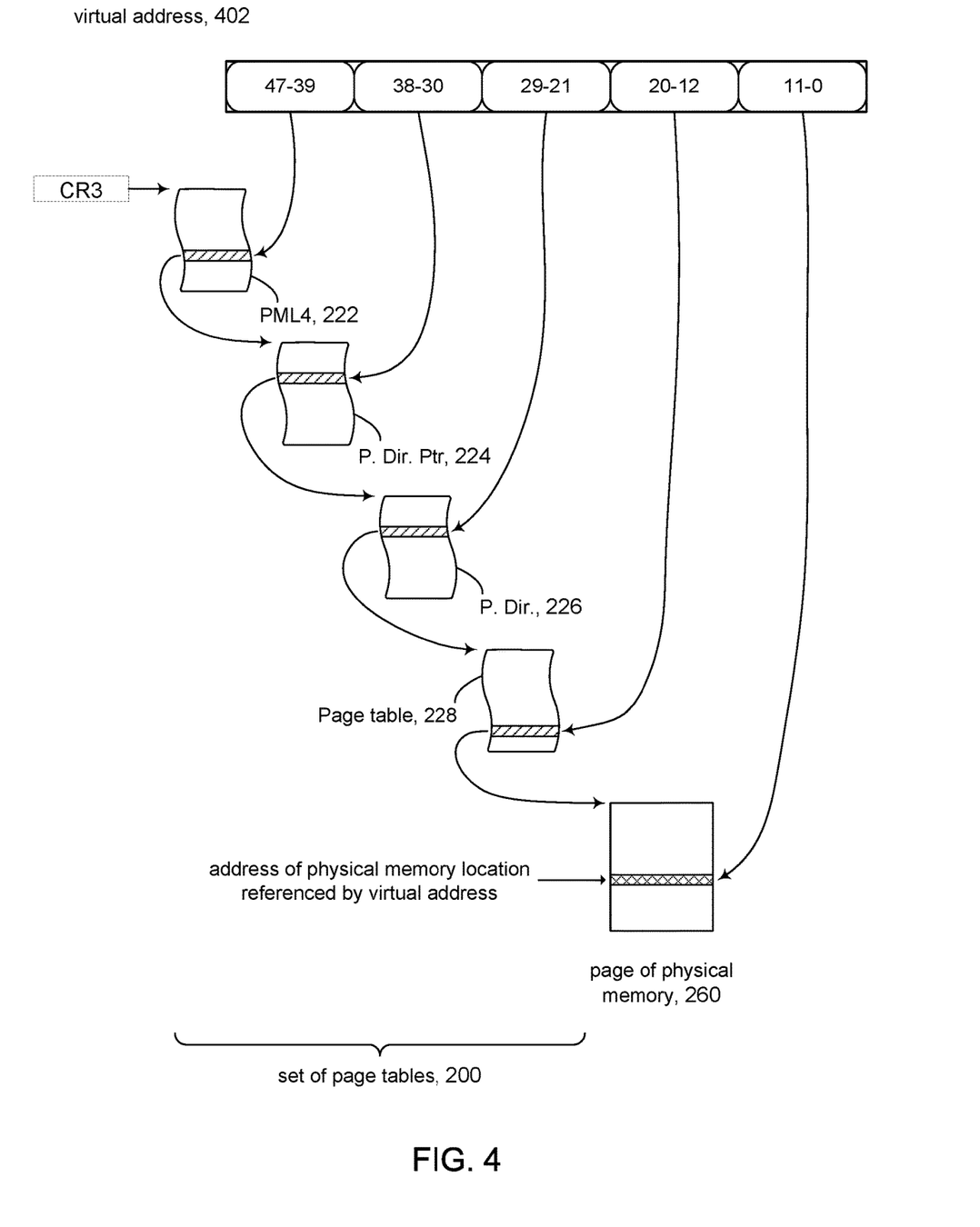
FIG. 4 shows an illustrative example of translating virtual address to a physical address.

Referring to FIG. 4, the discussion will now turn to a brief description of how a virtual address 402 can be translated to a physical address, for example in the MMU 114. The description will use the process page tables 200 (FIG. 2) as a reference. As explained above, the CPU can load a pointer to the process page tables 200 associated with the current process for which virtual addresses are to be translated to physical addresses. We can assume without loss of generality that the virtual address 402 is a 48-bit address. The first nine bits 47-39 of the virtual address 402 serve as an index into the PML4 (top level memory mapping table 222), recalling that in this example the memory mapping tables have 512 entries. The table entry indexed by bits 47-39 points to a page directory pointer table 224. The next nine bits 38-30 of the virtual address 402 serve as an index into the page directory pointer table 224, which stores a pointer to a page directory table 226. Continuing, bits 29-21 are used to index into the page directory table 226 to identify a page table 228. Finally, bits 20-12 index into page table 228 to identify the physical address of the page of physical memory 260. The final bits 11-0 in the virtual address 402 is an offset value that is added to the identified physical address to obtain the address of the physical memory location in physical memory 106 that the virtual address 402 translates to (assuming each page of physical memory 260 is $2^{12}$ bytes).

Figure 5:
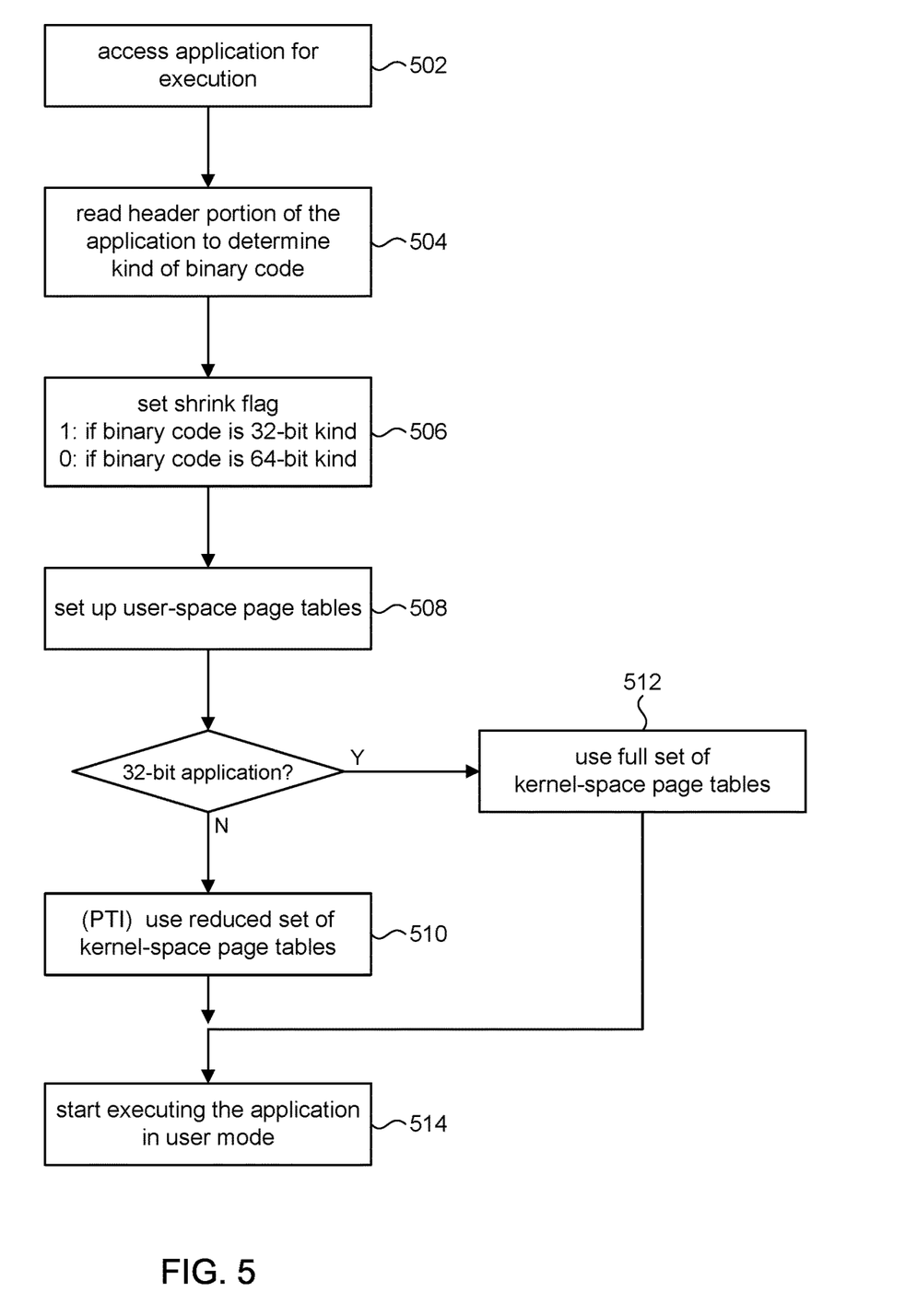
FIG. 5 depicts operations using page table isolation in accordance with some embodiments of the present disclosure.

Referring to FIG. 5, the discussion will now turn to a high level description of processing in the OS (e.g., OS 122, FIG. 1) to provide page table isolation (PTI) in accordance with the present disclosure. In some embodiments, for example, the OS can include computer executable program code, which when executed by a 64-bit CPU (e.g., CPU 112, FIG. 1), causes the CPU to perform the processing in accordance with FIG. 5. The flow of operations performed in the OS is not necessarily limited to the order of operations shown.

At operation 502, the OS can access or otherwise receive an application for execution. In some embodiments, for example, this operation can correspond to system call similar to the execv( ) system call in a UNIX-based OS to execute the application.

At operation 504, the OS can read a header portion of the application to determine whether the machine code in the application is for a 64-bit processor or a 32-bit processor.

At operation 506, the OS can associate a shrink bit with the application, and set the shrink bit to a first logical (data) value or a second logical (data) value depending on whether the application comprises 64-bit machine code or 32-bit machine code. In some embodiments, for example, the shrink bit that is associated with the application can be set to logical '1' if that application's machine code is defined for a 32-bit processor (i.e., the application is deemed to be shrunk). The shrink bit can be set to logical '0' if the application's machine code is defined for a 64-bit processor (i.e., the application is deemed to be not shrunk).

At operation 508, the OS can set up the user-space page tables (e.g., 214, FIG. 2) that define the user address space (e.g., 204, FIG. 2) portion of the application's virtual address space.

At operation 510, the OS can enable page table isolation (PTI) when the application is a 64-bit application. As discussed above, on meltdown-vulnerable CPUs, a user process can speculatively access the privileged kernel address space, thereby leaking kernel data indirectly. PTI fixes the leak by separating user-space and kernel-space page tables entirely to isolate the kernel-space page tables from the executing application. The OS can enable PTI by setting up a set of process pages tables for the application's virtual address space that maps the entire user address space but maps only a minimal portion of the kernel address space that is needed to enter or exit system calls, interrupts, exceptions, and the like. With PTI enabled, the kernel address space is not mapped and so the CPU's virtual address range does not include the kernel space. Accordingly during out-of-order execution, the CPU will not generate speculative addresses into the kernel space to begin with. In addition, attacks that "trick" a speculative access into using an address in the kernel address space will fail because the attempt will raise an exception in the MMU (e.g., a page fault) due to that kernel address not being mapped.

Figure 6:
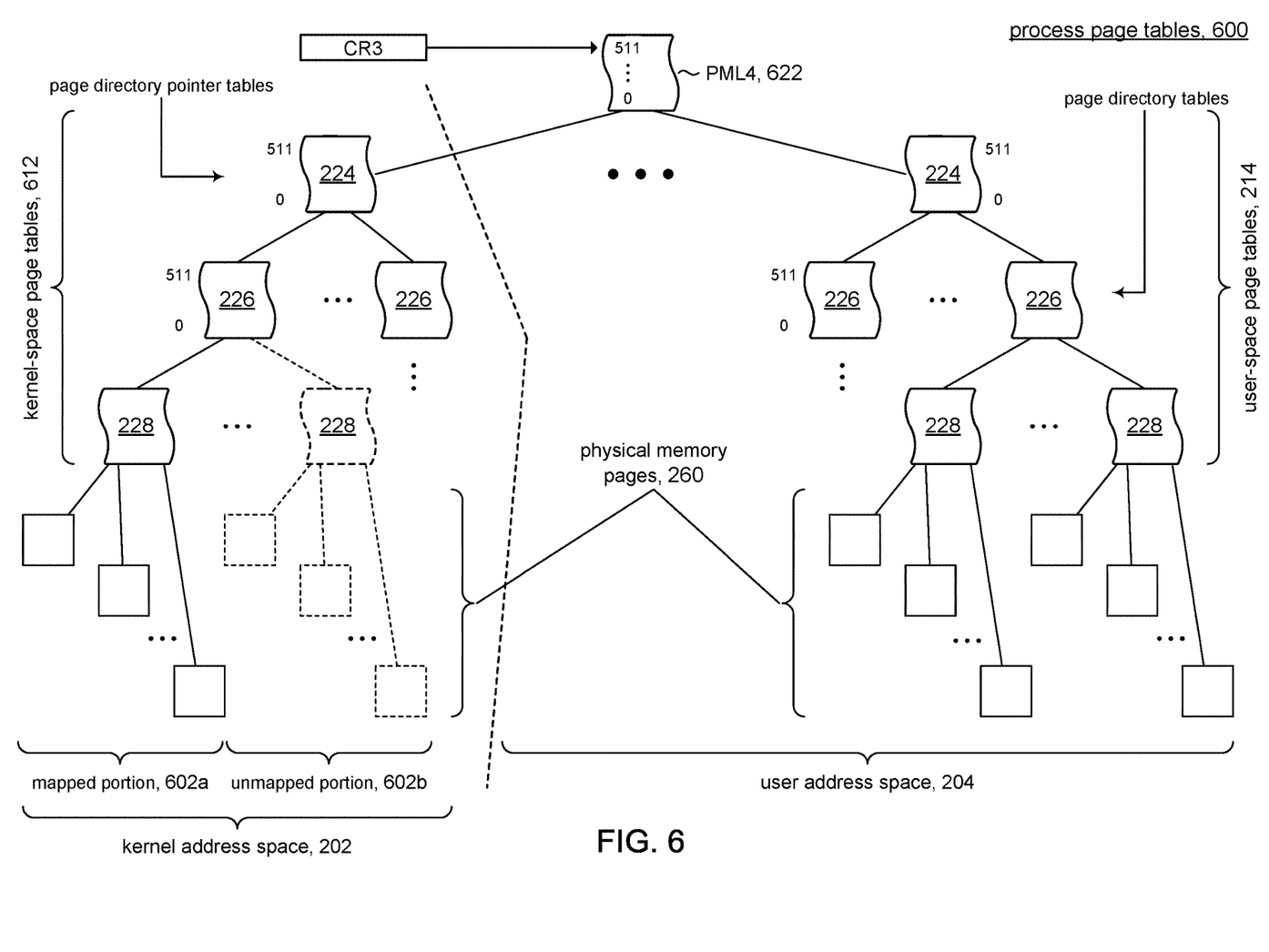
FIG. 6 illustrates an example of process page tables used to define a virtual address space with page table isolation.

Referring for a moment to FIGS. 2 and 6, suppose the process page tables 200 in FIG. 2 represent a set of process page tables without PTI. Accordingly, the kernel-space page tables 212 map the entire kernel address space 202. By comparison, the process page tables 600 in FIG. 6 represent a set of process page tables with PTI. The process page tables with PTI point to the same set of user-space page tables that belong to the application, but the portion that maps the kernel space is mostly absent. The kernel address space 202 is divided into a mapped portion 602a and an unmapped portion 602b. The mapped portion 602a represents that portion of the kernel address space 202 contains a small amount of kernel ("trampoline") code needed to provide system call entry and exit points, interrupt handling (e.g., interrupt descriptor table), exception handlers, and the like. The unmapped portion 602b represents that portion of the kernel address space 202 that should be isolated from the application. As shown in FIG. 6, in some embodiments PTI can be implemented by defining process page tables 600 comprising a reduced set of kernel-space page tables 612 comprising only a subset of the full set of kernel-space page tables (e.g., 212). The reduced set of kernel-space page tables 612 comprises only those page tables needed to map the mapped portion 602a of the kernel address space 202. Page tables corresponding to the unmapped portion 602b of the kernel address space 202 can be omitted.

Returning to operation 510 in FIG. 5, the OS can load the address of the root node (e.g., PML4 622, FIG. 6) of the process page tables that implement PTI into the CR3 register. The OS can then continue on to operation 514.

At operation 512, the OS can disable page table isolation (PTI) when the application is a 32-bit application. In accordance with the present disclosure, for example, instead of using the reduced set of kernel-space page tables discussed above, the OS can use the full set of kernel-space page tables (e.g., 212, FIG. 2) when the application is a 32-bit application to define a set of process page tables (e.g., 200) that do not implement PTI. In this case, the process pages tables for the application maps the entire kernel address space and the user address space. The OS can load the address of the root node (e.g., PML4 222, FIG. 2) of the process page tables that do not implement PTI into the CR3 register. The OS can then continue on to operation 514.

At operation 514, the OS can initiate execution of the application, and in particular the application can start executing the application in user mode. When the MMU 114 performs virtual address translation during execution of a 64-bit application, the CR3 register will contain a pointer to process page tables with PTI (e.g., 600, FIG. 6). Any attempts to access portions of kernel memory beyond the minimal kernel address space needed to enter or exit system calls, interrupts, exceptions, and the like (e.g., via speculative access during out-of-order execution) will result in the MMU 114 raising a memory fault, since those portions of memory are not mapped. In this way, PTI can prevent unauthorized access to the kernel address space when a 64-bit application executing in user mode attempts speculative access while performing out-of-order execution.

When the MMU 114 performs virtual address translation during execution of a 32-bit application, the CR3 register in accordance with the present disclosure will contain a pointer to process page tables that do not have PTI (e.g., 200, FIG. 2), which map the entire kernel address space. However, executing a 32-bit application in 32-bit compatibility mode restricts memory accesses to a 32-bit address space. In accordance with the present disclosure, the process page tables can map the entire kernel address space outside of this 32-bit address space. Since the instruction set comprising a 32-bit application is confined to 32-bit registers, a 32-bit application by definition cannot generate addresses greater than $2^{32}-1$ and so has no mechanism to speculatively access the kernel address space. Therefore, an OS executing on a 64-bit CPU executing a 32-bit application in 32-bit compatibility mode is are not at risk to the meltdown vulnerability even though the entire kernel address space is mapped. As will now be explained, this has significant benefits for 32-bit applications.

Figure 7:
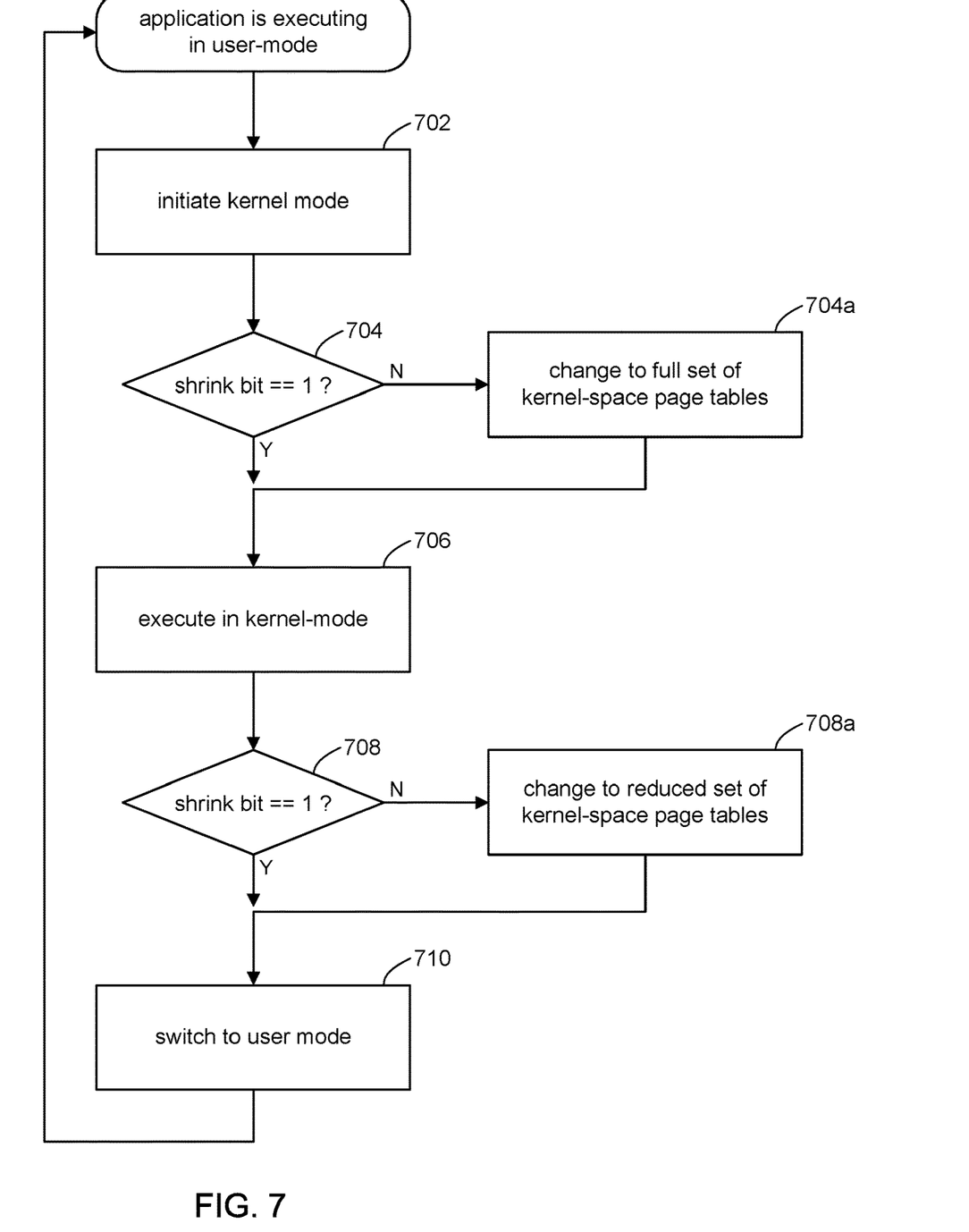
FIG. 7 depicts additional operations using page table isolation in accordance with some embodiments of the present disclosure.

Referring to FIG. 7, the discussion will now turn to a high level description of processing in an OS (e.g., OS 122, FIG. 1) to perform context switching of an executing application (process) in accordance with the present disclosure in a manner that can avoid the performance penalties of PTI in some situations. In some embodiments, for example, the OS can include computer executable program code, which when executed by a 64-bit CPU (e.g., CPU 112, FIG. 1), causes the CPU to perform the processing in accordance with FIG. 7. The flow of operations performed in the OS is not necessarily limited to the order of operations shown.

At operation 702, the OS can switch the execution of a process from user mode to kernel mode (context switch). We can assume without loss of generality that the process is initially executing in user mode. Kernel mode execution can be initiated, for example, when the process makes a system call; for example, open( ) read( ) write( ) etc. For instance, to make a system call, the process executing in user mode can store information (e.g., in a register) that indicates the service it requires from the OS, and then perform a trap instruction. The trap instruction causes the CPU to switch to kernel mode and jump to instructions in the kernel address space to handle the requested service. Kernel mode execution can also be initiated in response to an interrupt (e.g., I/O) or exception (e.g., divide by zero). For example, when an interrupt (or exception) event occurs, the CPU switches to kernel mode and jumps to an interrupt (or exception) handler to dispense with the event.

At operation 704, the OS can begin processing the context switch from user mode to kernel mode. In accordance with some embodiments of the present disclosure, the OS can look at the shrink bit associated with the process to determine if the process is executing 64-bit machine code (e.g., shrink bit set to logic '0') or 32-bit machine code (e.g., shrink bit set to logic '1'). When the process is a 64-bit process, then processing in the OS can continue to operation 704a, to map the full kernel space before proceeding to operation 706. On the other hand, recall from FIG. 5 that when the process is executing 32-bit machine code, the process page tables associated with the 32-bit process already map the full kernel space. Accordingly, the CR3 register need not be updated, and processing in the OS can proceed directly to operation 706.

Figure 8:
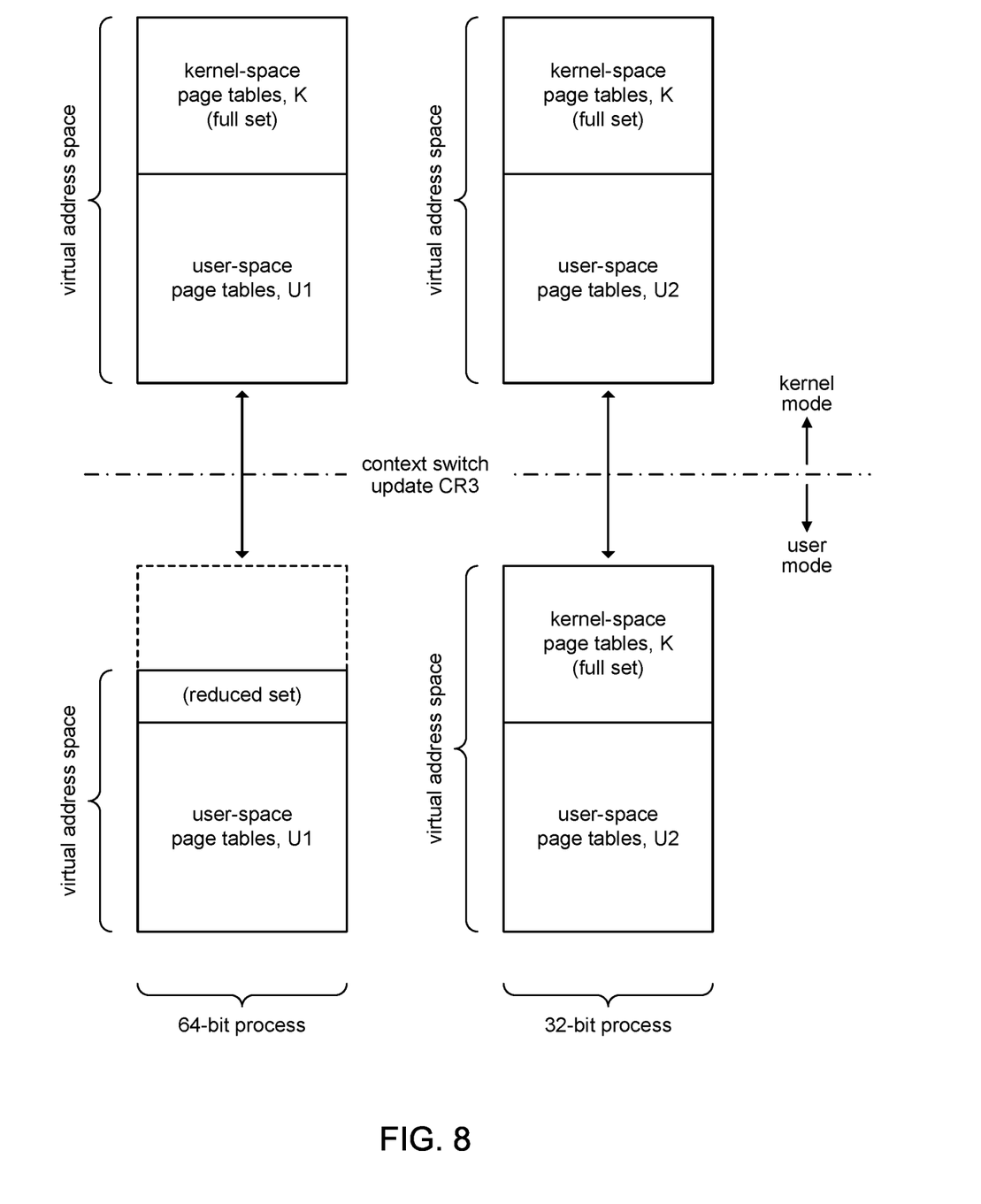
FIG. 8 illustrates kernel and user address spaces during context switching with page table isolation in accordance with the present disclosure.

At operation 704a, the OS can initiate kernel mode execution for a 64-bit process by changing to a non-PTI set of process page tables that contains a full set of kernel-space page tables. Recall from FIG. 5 that PTI is enabled for 64-bit applications in order to prevent speculative access into the kernel address space when executing in user mode. However when the process executes in kernel mode, full access to the kernel address space should be made available to the OS. Accordingly, when the OS determines that the shrink bit associated with the process is logical '0', meaning it is a 64-bit process, the OS can change the content of the CR3 register to point to a set of process page tables that maps the entire kernel address space. The OS can continue processing at operation 706. An example is schematically illustrated in FIG. 8, which shows the virtual address space of a 64-bit process is defined using PTI-enabled process page tables when executing in user mode, where the process page tables include the reduced set of kernel-space page tables. However, in kernel mode, CR3 is loaded with a pointer to a different set of process page tables comprising the full set of kernel-space page tables, thus expanding the virtual address space into the kernel address space.

At operation 706, the OS can complete the context switch from user mode to kernel mode, and continue executing in kernel mode to handle the system call or other event (e.g., interrupt, exception, etc.). When the OS completes handling the system call or other event, the OS can proceed to operation 708 to begin the context switch back to user mode.

Changing the kernel mapping for a 64-bit process, as explained above in operation 704a, is expensive in terms of the time cost of having to flush entries from the TLB and updating the TLB, thus impacting the CPU performance. In addition, when a context switch from user mode to kernel mode occurs in a 64-bit process, it can be appreciated that expanding the mapping of the kernel address space from only a portion of the address space to the full address space will result in numerous cache misses in the TLB (e.g., 118, FIG. 1) when the MMU performs virtual address translation. The reason is that handling the system call or other event will very likely require the OS to access areas in the expanded kernel address space whose virtual addresses had not previously been translated to physical addresses by the MMU. The MMU would therefore need to traverse the hierarchy of memory mapping tables comprising the process page tables to repopulate the TLB. Thus, TLB misses can further impact the CPU's overall performance in addition to the overhead of flushing and updating the TLB mentioned above.

By comparison, when a context switch from user mode to kernel mode occurs in a 32-bit process, there is no need to change process page tables for kernel mode processing because the process page table already maps the entire kernel address space. The TLB is therefore more likely to be populated with mappings into the full kernel address space, and so TLB misses may not be as frequent as can be when a context switch occurs with a 64-bit process. Referring again to FIG. 8, the virtual address spaces of a 32-bit process is defined using process page tables with PTI disabled, where the process page tables include the full set of kernel-space page tables even when executing in user mode. In kernel mode, the process page tables remains unchanged for the 32-bit process, and so does not incur the performance hit of PTI.

At operation 708, the OS can begin the context switch from user mode to kernel mode. In accordance with some embodiments of the present disclosure, the OS can look at the shrink bit associated with the process to determine if the process is executing 64-bit machine code (e.g., shrink bit set to logic '0') or 32-bit machine code (e.g., shrink bit set to logic '1'). When the process is a 64-bit process, then processing in the OS can continue to operation 708a, to remap the PTI-enabled process page tables before proceeding to operation 710. On the other hand, recall from FIG. 5 the process page tables for a 32-bit process can safely map the full kernel space. Accordingly, the CR3 register need not be updated, and processing in the OS can proceed directly to operation 706.

At operation 708a, the OS can switch to user mode execution for a 64-bit process by remapping the PTI-enabled process page tables associated with the 64-bit process. In some embodiments, for example, the OS can store a pointer the PTI-enabled process page tables into the CR3 register. The OS can continue processing at operation 710.

At operation 710, the OS can complete the context switch from kernel mode to user mode, where execution of the process can continue in user mode. In the case of a 32-bit process, since the process page tables were not remapped, address translation performance in the MMU (and hence overall CPU performance) does not get impacted because the TLB is not flushed. On the other hand, in the case of a 64-bit process, because the kernel address space is remapped when switching from kernel mode to user mode, the cost of flushing and updating the TLB is once again incurred along with the additional performance hit resulting from TLB misses due to virtual address translations in the user address space.

Observations and Conclusion

Meltdown exploits the speculative execution mechanism of the processor, tricking it to access privileged data. While speculative execution correctly prevents unprivileged processes from directly reading the speculative results, speculation has side-effects that can be observed and exploited by unprivileged processes. The meltdown proof-of-concept is able to deduce privileged data using timing attacks against data left in the cache. Future potential exploits could perhaps use other side-channels (such as counters or power). Thus, a robust defense against meltdown should eliminate speculative execution on privileged data completely.

Let P be a kernel memory page that an unprivileged process U is forbidden to access. U may speculatively read P only if U has P mapped in its page table, which means there exists a virtual memory address V that U can use to refer to P. Before meltdown, V existed because OSes typically mapped P (along with the entire system memory) in the process page tables of each process; see, for example, FIG. 3. For protection, OSes relied on hardware, marking P as "supervisor" in the page table entry for P, thereby instructing the CPU to allow only the kernel to access P. OSes additionally marked P as "global", which means that the P→V mapping remains valid across context switches in the TLB used to accelerate virtual-to-physical address translations.

Meltdown-vulnerable CPUs defer checking the supervisor bit, allowing cores to speculatively execute using privileged mappings and thereby opening a side-channel that U might exploit. Kernel page table isolation (PTI) described above addresses the problem by removing most kernel mappings from the process' virtual address space and maintaining a second, fuller virtual address space to be used by the kernel when servicing U; see, for example, the 64-bit process in FIG. 8.

As explained above, the virtual address space can correspond to one PML4, which serves as the root of a page-table hierarchy that translates virtual addresses to physical addresses. The CR3 register holds the physical address of the PML4 of the currently running process. A context switch includes storing a new address into CR3, causing non-global TLB entries to be flushed. Before PTI, the OS kept CR3 as is when servicing system calls (or interrupts); CR3 changed only when switching from one process to another, and even then the kernel address mappings remained valid in the TLB because the kernel-space page tables did not change from one process to another (e.g., FIG. 3). In contrast, with PTI, the OS updates CR3 upon each kernel entry and exit, for every system call (e.g., FIG. 8), and no global mappings are used so as to defend against meltdown. The user's PML4 (i.e., process page tables) only allows access to the minimal kernel-space page tables needed, notably to enter the kernel ("trampoline") to perform interrupt handling and system call entry. The kernel's PML4, on the other hand, encompasses both user-space and kernel-space mappings.

In some embodiments, PTI-enabled and PTI-disabled PML4's for a given process can be physically contiguous, so switching between them can be done by flipping only one CR3 bit, without having to map potentially sensitive OS data. The two PML4's can point to the same user-space page tables, so that updates need only be applied once, albeit TLB invalidations must be applied twice. As noted above, updating mappings is expensive, not only in terms of the direct cost of flushing and updating the TLB, but also due to TLB misses that occur as a result from having different kernel mappings in each address space.

In summary, PTI secures the kernel from meltdown at the cost of more overhead due to switching process page tables. The overhead may have minimal impact for compute-bound workloads, but can be substantial for I/O intensive workloads that invoke system calls frequently.

Embodiments in accordance with the present disclosure, leverage the fact that 32-bit pointers cannot access 64-bit kernel memory. We disclosed the idea of "shrink" processing as a safe addition to PTI, which is applicable to programs capable of running in 32-bit address spaces. We explain that shrink processing can restore the performance of some workloads based on 32-bit processes. Shrink uses the 32-bit compatibility mode feature to contain the accesses of a user-space process, even speculatively, into a 32-bit space. The kernel-space pages are mapped outside of this 32-bit space so that the 32-bit process has no mechanism to address kernel mappings since it is confined to 32-bit registers. Shrink avoids PTI penalties by protecting against meltdown speculative accesses through shrinking the user addressable process space rather than mapping/unmapping the kernel space.

Shrink can be suitable for workloads that perform little computation but enter the kernel frequently. In such workloads, running a 32-bit version of the binary would not significantly affect their performance. By contrast, running a 64-bit version of the binary would require enabling PTI in order to avoid meltdown, which can degrade their performance by increasing the cost of the system calls and interrupts.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a computing system comprising a target processor and physical memory, the computing system including an operating system and an application that executes on the target processor, the method comprising:

translating virtual addresses to physical addresses in the physical memory using user-space page tables associated with the executing application and a first set of kernel-space page tables when the target processor is executing in kernel mode;

translating virtual addresses to physical addresses in the physical memory using the user-space page tables associated with the executing application and the first set of kernel-space page tables when the target processor is executing in user mode and the application comprises machine code of a first kind; and translating virtual addresses to physical addresses in the physical memory using the user-space page tables associated with the executing application and a second set of kernel-space page tables that is at most a subset of the first set of kernel-space page tables when the target processor is executing in user mode and the application comprises machine code of a second kind.

2. The method of claim 1, wherein the first set of kernel-space page tables includes information that maps virtual addresses in a kernel address space of the operating system to physical addresses of the physical memory, wherein the second set of kernel-space page tables includes information that maps at most a subset of the virtual addresses in the kernel address space of the operating system to physical addresses of the physical memory.

3. The method of claim 1, wherein the second set of kernel-space page tables maps only to a portion of a kernel address space of the operating system sufficient to enter and exit system calls, to process interrupts, and to process exceptions.

4. The method of claim 1, further comprising:
setting a size flag associated with the application to a first data value when the application comprises machine code of the first kind;
setting the size flag to a second data value when the application comprises machine code of the second kind; and
using the size flag to determine whether to use the first set of kernel-space page tables or the second set of kernel-space page tables when the target processor is executing in user mode.

5. The method of claim 1, wherein the machine code of the first kind comprises machine coded instructions of a processor having a word size that is shorter in length than a word size of the target processor, wherein the machine code of the second kind comprises machine coded instructions of the target processor.

6. The method of claim 1, wherein the machine code of the first kind is machine code for a 32-bit processor, wherein the machine code of the second kind is machine code for a 64-bit processor.

7. The method of claim 1, wherein the user-space page tables include information that maps virtual addresses in a user address space of the executing application to physical addresses in the physical memory.

8. A non-transitory computer-readable storage medium having stored thereon computer executable instructions, which when executed by a computer device, cause the computer device to:
translate virtual addresses to physical addresses in a physical memory using user-space page tables associated with an application executing on the computer device and a first set of kernel-space page tables when a target processor of the computing device is executing in kernel mode;
translate virtual addresses to physical addresses in the physical memory using the user-space page tables associated with the executing application and the first set of kernel-space page tables when the target processor is executing in user mode and the application comprises machine code of a first kind; and
translating virtual addresses to physical addresses in the physical memory using the user-space page tables associated with the executing application and a second set of kernel-space page tables that is at most a subset of the first set of kernel-space page tables when the target processor is executing in user mode and the application comprises machine code of a second kind.

9. The non-transitory computer-readable storage medium of claim 8, wherein the first set of kernel-space page tables includes information that maps virtual addresses in a kernel address space of an operating system executing on the computing device to physical addresses of the physical memory, wherein the second set of kernel-space page tables includes information that maps at most a subset of the virtual addresses in the kernel address space of the operating system to physical addresses of the physical memory.

10. The non-transitory computer-readable storage medium of claim 8, wherein the second set of kernel-space page tables maps only to a portion of a kernel address space of an operating system executing on the computing device to enter and exit system calls, to process interrupts, and to process exceptions.

11. The non-transitory computer-readable storage medium of claim 8, wherein the computer executable instructions, which when executed by the computer device, further cause the computer device to:
set a size flag associated with the application to a first data value when the application comprises machine code of the first kind;
set the size flag to a second data value when the application comprises machine code of the second kind; and
use the size flag to determine whether to use the first set of kernel-space page tables or the second set of kernel-space page tables when the target processor is executing in user mode.

12. The non-transitory computer-readable storage medium of claim 8, wherein the machine code of the first kind comprises machine coded instructions of a processor having a word size that is shorter in length than a word size of the target processor, wherein the machine code of the second kind comprises machine coded instructions of the target processor.

13. The non-transitory computer-readable storage medium of claim 8, wherein the machine code of the first kind is machine code for a 32-bit processor, wherein the machine code of the second kind is machine code for a 64-bit processor.

14. A computer apparatus comprising:
a target processor;
a physical memory; and
a computer-readable storage medium comprising instructions for controlling the target processor to be operable to:
translate virtual addresses to physical addresses in the physical memory using user-space page tables associated with an application executing on the computer apparatus and a first set of kernel-space page tables when the target processor is executing in kernel mode;
translate virtual addresses to physical addresses in the physical memory using the user-space page tables associated with the executing application and the first set of kernel-space page tables when the target processor is executing in user mode and the application comprises machine code of a first kind; and
translating virtual addresses to physical addresses in the physical memory using the user-space page tables associated with the executing application and a second set of kernel-space page tables that is at most a subset of the first set of kernel-space page tables when the target processor is executing in user mode and the application comprises machine code of a second kind.

15. The apparatus of claim 14, wherein the first set of kernel-space page tables includes information that maps virtual addresses in a kernel address space of an operating system executing on the computing apparatus to physical addresses of the physical memory, wherein the second set of kernel-space page tables includes information that maps at most a subset of the virtual addresses in the kernel address space of the operating system to physical addresses of the physical memory.

16. The apparatus of claim 14, wherein the second set of kernel-space page tables maps only to a portion of a kernel address space of an operating system executing on the computer apparatus to enter and exit system calls, to process interrupts, and to process exceptions.

17. The apparatus of claim 14, wherein the computer-readable storage medium further comprises instructions for controlling the target processor to be operable to:

set a size flag associated with the application to a first data value when the application comprises machine code of the first kind;

set the size flag to a second data value when the application comprises machine code of the second kind; and use the size flag to determine whether to use the first set of kernel-space page tables or the second set of kernel-space page tables when the target processor is executing in user mode.

18. The apparatus of claim 14, wherein the machine code of the first kind comprises machine coded instructions of a processor having a word size that is shorter in length than a word size of the target processor, wherein the machine code of the second kind comprises machine coded instructions of the target processor.

19. The apparatus of claim 14, wherein the machine code of the first kind is machine code for a 32-bit processor, wherein the machine code of the second kind is machine code for a 64-bit processor.

20. The apparatus of claim 14, wherein the user-space page tables include information that maps virtual addresses in a user address space of the executing application to physical addresses in the physical memory.

* * * * *